United States Patent
Yoshida

(10) Patent No.: US 7,683,590 B2
(45) Date of Patent: Mar. 23, 2010

(54) STEP-DOWN SWITCHING DC-DC CONVERTER

(75) Inventor: Teiji Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/403,572

(22) Filed: Mar. 13, 2009

(65) Prior Publication Data

US 2009/0230935 A1     Sep. 17, 2009

(30) Foreign Application Priority Data

Mar. 13, 2008   (JP) .............................. 2008-063615

(51) Int. Cl.
*G05F 1/656* (2006.01)
*G05F 1/613* (2006.01)
*G05F 3/16* (2006.01)

(52) U.S. Cl. ..................... 323/224; 323/282; 323/222

(58) Field of Classification Search ................. 323/224, 323/222, 282, 284
See application file for complete search history.

(56) References Cited

U.S. PATENT DOCUMENTS

| | | | |
|---|---|---|---|
| 5,612,610 A * | 3/1997 | Borghi et al. ............... | 323/222 |
| 6,040,686 A * | 3/2000 | Schenkel .................... | 323/282 |
| 6,188,206 B1 * | 2/2001 | Nguyen et al. .............. | 323/222 |
| 6,229,292 B1 * | 5/2001 | Redl et al. .................. | 323/285 |
| 6,275,016 B1 * | 8/2001 | Ivanov ........................ | 323/224 |
| 6,495,993 B2 * | 12/2002 | Eagar ........................ | 323/271 |
| 7,026,795 B2 * | 4/2006 | So .............................. | 323/222 |
| 2002/0113581 A1 * | 8/2002 | Eagar et al. ................. | 323/282 |
| 2005/0156579 A1 * | 7/2005 | Moussaoui et al. .......... | 323/224 |

FOREIGN PATENT DOCUMENTS

| | | |
|---|---|---|
| JP | 1992058757 A | 2/1992 |
| JP | 1992364358 A | 12/1992 |

\* cited by examiner

*Primary Examiner*—Bao Q Vu

(57) ABSTRACT

A step-down switching DC-DC converter may include an input coil on the input side, an output coil on the output side, a switch, an output capacitor, a first series circuit connected between a connection point on which the input coil and the switch are connected each other and a negative pole of a power source, and a second series circuit connected between a connection point on which the output coil and the switch are connected to each other and the negative pole of the power source. A connection point between a first intermediate capacitor and the first intermediate coil is connected to a connection point between a second intermediate capacitor and the switch via a switching device cooperating with the switch. The input coil and the first intermediate coil are electromagnetically coupled with each other. The output coil and the second intermediate coil are electromagnetically coupled with each other.

8 Claims, 10 Drawing Sheets

Fig.2

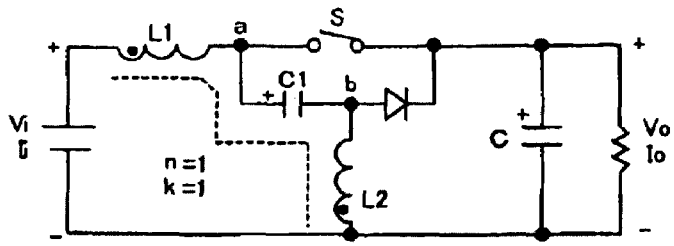

| Transfer function | $V_o=V_i*D$ (stepping-down: $0<D<1$) $V_i=V_o/D$ $D=V_o/V_i$ | | | |
|---|---|---|---|---|
| Ripple current ($\Delta I_{L1}$, $\Delta I_{L2}$, $\Delta I_C$) | Coil L1 /\/\/\ | Coil L2 /\/\/\ | Capacitor C /\/\/\ | (a) No electromagnetic coupling between L1 and L2 (Current value at L1=L2=L) |
| | $\Delta I_{L1}(\Delta I_{L2})$ $=(V_i-V_o)*T_{on}/L$ | | $\Delta I_C$ $=(V_i-V_o)*T_{on}/L*2$ | |
| | Coil L1 /\/\ | Coil L2 /\/\ | Capacitor C /\/\/\ | (b) Electromagnetic coupling between L1 and L2, k=n $n=\sqrt{(L1/L2)}=k$ $0\leq n\leq 1, 0\leq k\leq 1$ (Current value at L1=L2=L) |
| | $\Delta I_{L1}(\Delta I_{L2})$ $=(V_i-V_o)*T_{on}/L/2$ | | $\Delta I_C$ $=(V_i-V_o)*T_{on}/L$ | |
| Ripple voltage ($V_a$, $V_b$) | Point a ⊓⊔⊓⊔ $\{V_i\}$ | Point b ⊓⊔⊓ $V_i\{$ | $V_i+V_o$ $V_o$ $\}2*V_i$ $-(V_i-V_o)$ | Current value at L1=L2=L |
| Both-end voltage ($V_{L1}$, $V_{L2}$) | Coil L1 ⊓⊔⊓⊔ | Coil L2 ⊓⊔⊓⊔ | $V_i-V_o$ $0 \}V_i$ $-V_o$ | Voltage value at L1=L2=L |

| Transfer function (d) | $V_o = V_i * d$ (Stepping-down, Input/output voltages with same polarity: $0 < d < 1$) <br> $V_i = V_o / d$ <br> $d = V_o / V_i$ |
|---|---|

Node potential and current flow when switch S is turned on

Node potential and current flow when switch S is turned off

Fig.4c

| Transfer function | $V_o = V_i * d$ (Stepping-down, Input/output voltages with same polarity, $0<d<1$) $V_i = V_o/d$ $d = V_o/V_i$ | | | | | |
|---|---|---|---|---|---|---|
| Ripple current ($\Delta IL_1$, $\Delta IL_{m1}$, $\Delta IL_2$, $\Delta IL_{m2}$) | Coil L1 $\Delta IL_1 = (V_i-V_o)*T_{on}/2XL$ | Coil Lm1 $\Delta IL_{m1} = (V_i-V_o)*T_{on}/2XL_m$ | Coil L2 $\Delta IL_2 = (V_i-V_o)*T_{on}/2XL$ | Coil Lm2 $\Delta IL_{m2} = (V_i-V_o)*T_{on}/2XL_m$ | (a) No electromagnetic coupling between L1 and Lm1, No electromagnetic coupling between L2 and Lm2 | Current value at L1=L2=L, Lm1=Lm2=Lm |
| | ≒0 | ditto | $\Delta IL_2 = (V_i-V_o)*T_{on}/2XL$ | ditto | (b) Electromagnetic coupling between L1 and Lm1, $k_{11}=n_{11}$ $n_{11}=\sqrt{(L_{m1}/L_1)}$ $0 \leq n_{11} \leq 1$, $0 \leq k_{11} \leq 1$ | |
| | $\Delta IL_1 = (V_i-V_o)*T_{on}/2XL$ | ditto | ≒0 | ditto | (c) Electromagnetic coupling between L2 and Lm2, $k_{22}=n_{22}$ $n_{22}=\sqrt{(L_{m2}/L_2)}$ $0 \leq n_{22} \leq 1$, $0 \leq k_{22} \leq 1$ | |
| | ≒0 | ditto | ≒0 | ditto | (d) Electromagnetic coupling between L1 and Lm1, $k_{22}=n_{11}$, $n_{11}=\sqrt{(L_{m1}/L_1)}$ $0 \leq n_{11} \leq 1$, $0 \leq k_{11} \leq 1$ and between L2 and Lm2, $k_{22}=n_{22}$ Voltage value at L1=L2=L, Lm1=Lm2=Lm $n_{22}=\sqrt{(L_{m2}/L_2)}$ $0 \leq n_{22} \leq 1$, $0 \leq k_{22} \leq 1$ | |
| Ripple voltage ($V_a$, $V_b$, $V_c$, $V_d$) | Point a | Point b | Point c | Point d --- $V_i+V_o/2$ --- $(V_i+V_o)/2$ --- $V_o/2$ --- $(V_o-V_i)/2$ 0 --- $-(V_o-V_i)/2$ --- $-V_i/2$ | | Voltage value at L1=L2=L, Lm1=Lm2=Lm |
| Both-end voltage of coil ($V_{L1}$, $V_{Lm1}$, $V_{L2}$, $V_{Lm2}$) | Coil L1 | Coil Lm1 | Coil L2 | Coil Lm2 $(V_i-V_o)/2$ 0 $-V_o/2$ $V_i/2$ | | Voltage value at L1=L2=L, Lm1=Lm2=Lm |

Fig.5

| No. | Conceptual view | Remarks |
|---|---|---|
| 1 | 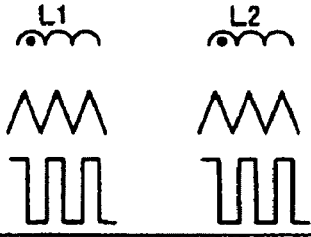 | Two coils L1, L2 in circuit<br>Ripple current<br>Both-end voltage |
| 2 | 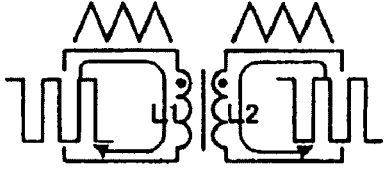 | Circuit with two electromagnetically-coupled coils L1, L2 |
| 3 | 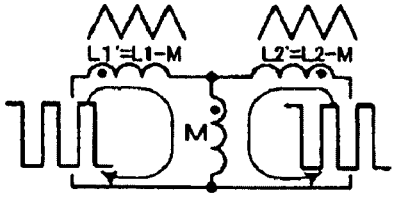 | Equivalent circuit with two electromagnetically-coupled coils<br>Turn ratio $n=\sqrt{(L1/L2)}$<br>Coupling coefficient k<br>Mutual inductance $M=k\sqrt{(L1 \times L2)}$ |
| 3-1 | 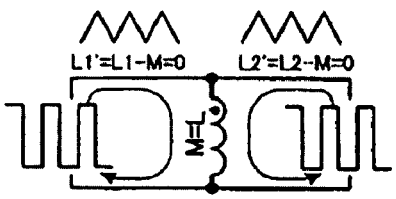 | In (3),<br>(a) at k=n=1,<br>L1=L2=L<br>M=L<br>1/2 of ripple current before both L1 and L2 are coupled<br>(because ripple current at M=L=L1=L2 is halved) |
| 3-2 | 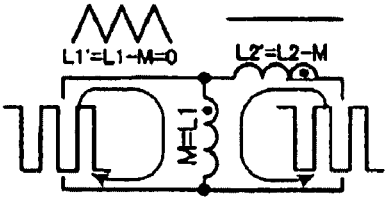 | (b) at $0<k=n<1$, $M=\sqrt{(L1/L2)} \times \sqrt{(L1 \times L2)}=L1$<br>Ripple current of L1 is the same as before electromagnetic coupling<br>Ripple current of L2 is 0<br>(because L1 impedance ≪ L2 impedance or Both-end voltages of L2-M are always 0V) |
| 3-3 | 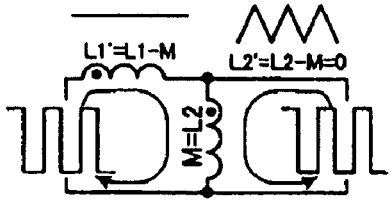 | (c) at $0<k=(1/n)<1$, $M=\sqrt{(L2/L1)} \times (L1 \times L2)=L2$<br>Ripple current of L1 is 0<br>Ripple current of L2 is the same as before electromagnetic coupling<br>(because L1 impedance ≫ L2 impedance or Both-end voltages of L2-1 are always 0V) |

STEP-DOWN SWITCHING DC-DC CONVERTER

This application is based upon and claims the benefit of priority from Japanese Patent Application No. 2008-063615 filed on Mar. 13, 2008, the content of which is incorporated by reference.

BACKGROUND OF THE INVENTION

1. Field of the Invention

The present invention relates to a step-down switching DC-DC converter. More particularly, the present invention relates to a step-down switching DC-DC converter that is suitably applicable to power systems and devices using a solar cell or a battery as a power source, to systems and devices for charging and discharging a battery, to power systems and devices requiring low noise and the like.

2. Description of the Related Art

In an interplanetary probe using a solar cell as a power source, the supply voltage of the solar cell greatly varies when there is a great variation in the distance between the sun and the interplanetary probe. A power system of the interplanetary probe is required to step down the varying voltage of the solar cell to a desired voltage level before supplying the voltage to a load side. For this purpose, such a power system generally uses a switching DC-DC converter (or a switching regulator), which has low power loss and which generates less heat, as disclosed in Japanese Laid-Open Patent Application 1992-58757.

In addition, when the interplanetary probe is designed to measure electromagnetic or magnetic fields of a planet, a switching DC-DC converter is required to generate less switching noise.

However, the difficulty in using this kind of conventional, step-down switching DC-DC converter is that it will not feature low noise characteristics, as will be described below.

FIG. 1 is a circuit diagram illustrating the circuit structure of a typical buck converter in a typical step-down switching DC-DC converter. Referring to FIG. 1, as indicated in a block of ripple current ΔI, input current flowing through switch S has a pulse wave, and output current flowing along coil L has a triangle wave.

FIG. 2 is a circuit diagram illustrating the circuit structure of a typical low noise buck converter in a typical step-down switching DC-DC converter. Referring to FIG. 2, as indicated in the block of ripple currents ΔIL1 and ΔIC, both input current flowing along a coil L1 and output current flowing through a capacitor C can have a triangle wave.

However, the conventional step-down switching DC-DC converters shown in FIGS. 1 and 2 still have a problem in that they generate severe noise.

Specifically, according to the step-down switching DC-DC converter shown in FIG. 1, since input current flowing through switch S is a pulse wave, the switching frequency causes severe noise and thus a harmonic wave of the switching frequency also causes severe noise.

In the case of the step-down switching DC-DC converter shown in FIG. 2, both the input current flowing through the coil L1 and the output current flowing through the capacitor C are a triangle wave. Thus, the step-down switching DC-DC converter shown in FIG. 2 can cause less noise than the construction shown in FIG. 1 using the pulse wave. However, as indicated with the ripple currents ΔIL1 and ΔIC, currents flowing through input coil L1 and capacitor C also include the noise components of a switching frequency and its harmonic wave irrespective of whether not input coil L1 and intermediate coil L2 are electromagnetically coupled. Accordingly, it is impossible to eliminate ripple currents ΔIL1 and ΔIC (or achieve zero ripple currents).

SUMMARY OF THE INVENTION

The present invention has been developed, taking into consideration such circumstances, and an object of the invention is to provide a step-down switching DC-DC converter that has low noise characteristics.

According to an aspect of the invention, the step-down switching DC-DC converter of the invention may include a power source; an input coil placed on input side; an output coil placed on output side; a switch turning on to establish a connection between the input coil and the output coil, and turning off to disconnect the connection between the input coil and output coil; an output capacitor smoothing an output voltage; a first series circuit connected in parallel between a connection point, on which the input coil and the switch are connected to each other, and the negative pole of the power source, the first series circuit including a first intermediate capacitor and a first intermediate coil; and a second series circuit connected in parallel between a connection point, on which the output coil and the switch are connected to each other, and the negative pole of the power source, the second series circuit including a second intermediate capacitor and a second intermediate coil. In the step-down switching DC-DC converter, a connection point, on which the first intermediate capacitor and the first intermediate coil are connected to each other, is connected to a connection point, on which the second intermediate capacitor and the switch are connected to each other, via a switching device that cooperate with the switch to complementarily turn on and off, the input coil and the first intermediate coil that are electromagnetically coupled with each other, and the output coil and the second intermediate coil are electromagnetically coupled with each other.

According to another aspect of the invention, the step-down switching DC-DC converter of the invention may include a power source; an input coil placed on the input side; an output coil placed on the output side; a switch turning on to establish a connection between the input coil and the output coil, and turning off to disconnect the connection between the input coil and output coil; an output capacitor smoothing an output voltage; a first series circuit connected in parallel between a connection point, on which the input coil and the switch are connected to each other, and a negative pole of the power source, the first series circuit including a first intermediate capacitor and a first intermediate coil; and a second series circuit connected in parallel between a connection point, on which the output coil and the switch are connected to each other, and the negative pole of the power source, the second series circuit including a second intermediate capacitor and a second intermediate coil. In the step-down switching DC-DC converter, a connection point, on which the first intermediate capacitor and the first intermediate coil are connected to each other, is connected to a connection point, on which the second intermediate capacitor and the switch are connected to each other, via a switching device that cooperate with the switch to complementarily turn on and off, the input coil and the second intermediate coil that are electromagnetically coupled with each other, and the output coil and the first intermediate coil that are electromagnetically coupled with each other.

According to the step-down switching DC-DC converter of the invention, the following effects can be obtained.

First, since the first intermediate coil is electromagnetically coupled with the input coil and the second intermediate coil is electromagnetically coupled with the output coil, ripple currents at the input and output coils can be eliminated and thus noise can be reduced.

Secondly, since noise is reduced and since the size of the filter to be added is small, the step-down switching DC-DC converter can be miniaturized.

Thirdly, since all both-end voltages at four coils including the input, output, first intermediate and second intermediate coils can be set to the same value, all the coils can be combined together and integrated into a single transformer and the step-down switching DC-DC converter can be further miniaturized.

The above and other objects, features, and advantages of the present invention will become apparent from the following description with reference to the accompanying drawings, which illustrate examples of the present invention.

BRIEF DESCRIPTION OF THE DRAWINGS

FIG. 2 is a circuit diagram illustrating the circuit structure of a typical low noise buck converter in a typical step-down switching DC-DC converter;

FIG. 4C is a diagram illustrating waveforms of current and voltage at the nodes in the step-down switching DC-DC converter shown in FIG. 3;

FIG. 5 is a diagram illustrating a method of reducing ripple currents and a concept of eliminating ripples in a typical step-down switching DC-DC converter;

DETAILED DESCRIPTION OF THE PREFERRED EMBODIMENTS

Exemplary embodiments of a step-down switching DC-DC converter according to the present invention will now be described more fully hereinafter with reference to the accompanying drawings.

FEATURES OF THE INVENTION

Prior to describing particular embodiments of the present invention, the general features of the present invention will be described.

The present invention provides a step-down switching DC-DC converter including an input coil, an output coil and an output capacitor, wherein series circuits each including an intermediate capacitor and an intermediate coil are connected in parallel to the input side and the output side, in predetermined positions from both ends of a switch, respectively; a connection point, on which the intermediate capacitor on the input side and the intermediate coil are connected to each other, is connected via a switching device to charge the intermediate capacitor on the output side; and the input coil and the intermediate coil on the input side are electromagnetically coupled with each other, and the output coil and the intermediate coil on the output side are electromagnetically coupled with each other.

Figure 1:
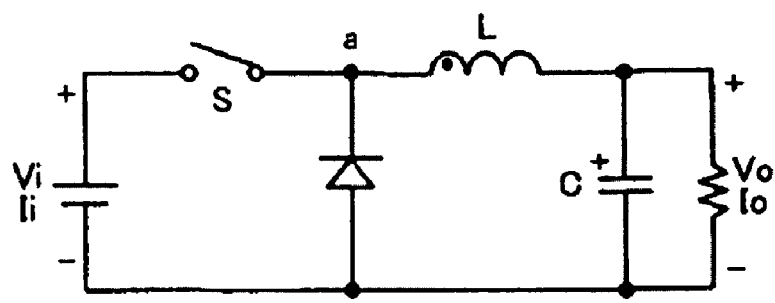
FIG. 1 is a circuit diagram illustrating the circuit structure of a typical buck converter in a typical step-down switching DC-DC converter.
Figure 3:
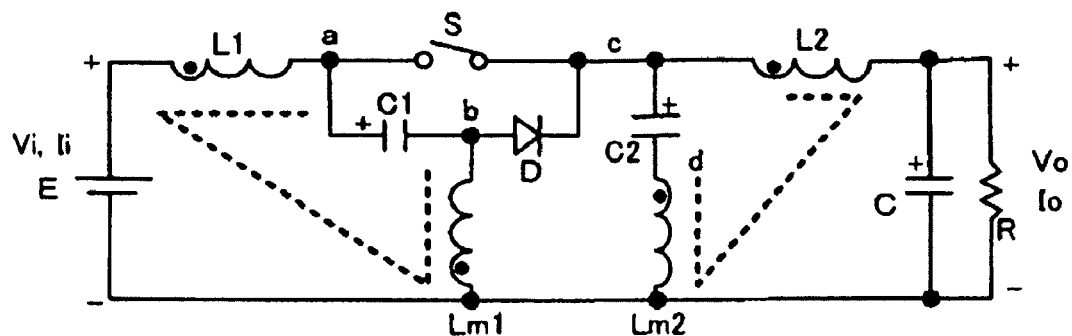
FIG. 3 is a circuit diagram illustrating an exemplary embodiment of a step-down switching DC-DC converter according to the present invention.

FIG. 3 is a circuit diagram illustrating an exemplary embodiment of a step-down switching DC-DC converter according to the present invention.

As shown in FIG. 3, the step-down switching DC-DC converter of this embodiment includes input coil L1, output coil L2, first intermediate coil Lm1 placed on the input side, second intermediate coil Lm2 placed on the output side, first intermediate capacitor C1 placed on the input side, second intermediate capacitor C2 placed on the output side, switch S, diode D acting as a switching device, and smoothing output capacitor C. The step-down switching DC-DC converter can realize low noise characteristics by converting a ripple current waveform flowing through input and output coils L1 and L2 into a triangle wave or by eliminating the ripple current waveform (that is, achieving zero ripple currents).

In the step-down switching DC-DC converter shown in FIG. 3, a resistor R is connected to a positive pole of DC power source E via input coil L1, switch S and output coil L2, and is directly connected at a negative pole thereof to the DC power source. A first series circuit including first intermediate capacitor C1 and first intermediate coil Lm1, which are placed on the input side, is connected in parallel between a connection point on the input side, on which input coil L1 and switch S are connected to each other, and the negative pole of DC power source E. A second series circuit including second intermediate capacitor C2 and second intermediate coil Lm2 is connected in parallel between a connection point on the output side, on which output coil L2 and switch S are connected to each other, and the negative pole of resistor R. In addition, a connection point on the input side, on which first intermediate capacitor C1 and first intermediate coil Lm1 are connected to each other, is connected to a connection point on the output side, on which switch S and second intermediate capacitor C2 are connected to each other, via diode D of the switching element.

In order to convert input voltage Vi from DC power source E into predetermined output voltage Vo before supplying the voltage to resistor R, the step-down switching DC-DC converter shown in FIG. 3 controls the ratio of the on-time of switch S in switching frequency f as follows:

Transfer function $(d)$=(Output voltage $Vo$)÷(Input voltage $Vi$)

That is, the step-down switching DC-DC converter controls a duty ratio so that it is the same as the transfer function (d) (0<d<1). Diode D of the switching device serves to charge second intermediate capacitor C2 by discharging the energy of DC power source E stored in first intermediate coil Lm1 on the input side to the output side during the period in which switch S is turned off, and cooperates with the switch S to perform complementary switching. As a result, the desired output voltage Vo can be obtained by stepping down the desired input voltage Vi using the transfer function (d).

In addition, input coil L1 and first intermediate coil Lm1 on the input side are electromagnetically-coupled through mutual inductance, and the output coil L2 and second intermediate coil Lm2 on the output side are electromagnetically-coupled through mutual inductance M2. Here, ripple current ΔIL1 flowing through input coil L1 can be substantially eliminated (that is, a zero ripple current can be achieved) by setting coupling coefficient k11 and turn ratio n11 between input coil L1 and first intermediate coil Lm1 using Equation 1 below.

$$k11 = \frac{M11}{\sqrt{L1 \times Lm1}}$$
$$n11 = \sqrt{\frac{Lm1}{L1}}$$
$$k11 = n11$$

Equation 1

Likewise, ripple current ΔIL2 flowing through output coil L2 can be substantially eliminated (that is, a zero ripple current can be achieved) by setting coupling coefficient k22 and turn ratio n22 between output coil L2 and second intermediate coil Lm2 using Equation 2 below.

$$k22 = \frac{M22}{\sqrt{L2 \times Lm2}}$$
$$n22 = \sqrt{\frac{Lm2}{L2}}$$
$$k22 = n22$$

Equation 2

Figure 4A:
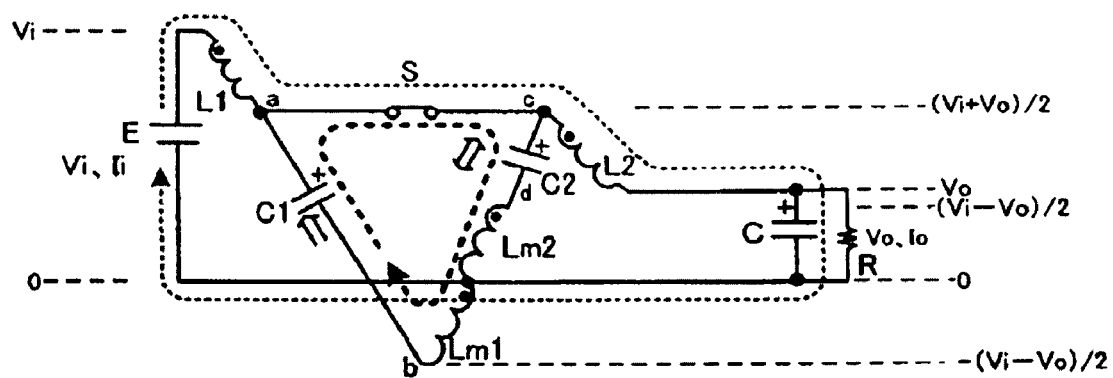
FIG. 4A is a diagram illustrating potentials at nodes and the flow of current when a switch is turned on in the step-down switching DC-DC converter shown in FIG. 3.
Figure 4B:
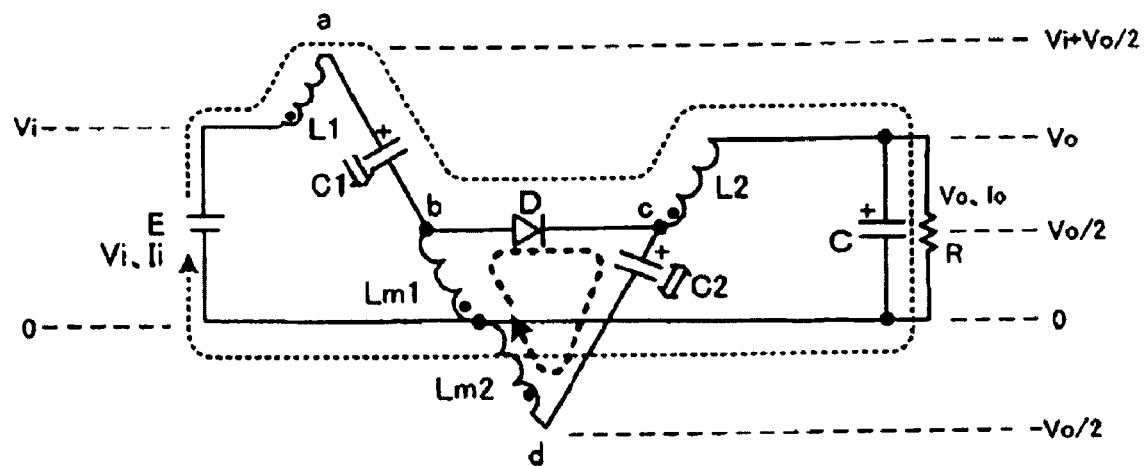
FIG. 4B is a diagram illustrating potentials at the nodes and the flow of current when the switch is turned off in the step-down switching DC-DC converter shown in FIG. 3.

FIG. 4A is a diagram illustrating potentials at nodes and the flow of current when a switch is turned on in the step-down switching DC-DC converter shown in FIG. 3. FIG. 4B is a diagram illustrating potentials at the nodes and the flow of current when the switch is turned off in the step-down switching DC-DC converter shown in FIG. 3, and FIG. 4C is a diagram illustrating waveforms of current and voltage at the nodes in the step-down switching DC-DC converter shown in FIG. 3.

As shown in FIG. 4A, when switch S is turned on, energizing current flows through all the coils including input coil L1, first intermediate coil Lm1, output coil L2 and second intermediate coil Lm2, and current flows from the input side of DC power source E to the output side of resistor R. Here, discharging current flows through first intermediate capacitor C1 and through one half of second intermediate capacitor C2, but charging current flows through the other half of second intermediate capacitor C2.

In addition, although described more fully later, for example, when both input coil L1 and output coil L2 have the same inductance (L1=L2=L) and when both first intermediate coil Lm1 and second intermediate coil Lm2 have the same inductance (Lm1=Lm2=Lm), ripple voltages at the nodes are determined using Equation 3 below:

$$\left. \begin{array}{l} Va = \frac{(Vi+Vo)}{2} \\ Vb = -\frac{(Vi-Vo)}{2} \\ Vc = \frac{(Vi+Vo)}{2} \\ Vd = \frac{(Vi-Vo)}{2} \end{array} \right\},$$

Equation 3 where Va is a ripple voltage at connection point a between input coil L1 and switch S, Vb is a ripple voltage at connection point b between first intermediate capacitor C1 and first intermediate coil Lm1, Vc is a ripple voltage at a connection point c between switch S and output coil L2, and Vd is a ripple voltage at connection point d between second intermediate capacitor C2 and second intermediate coil Lm2.

As shown in FIG. 4B, when switch S is turned off, opening current flows through all the coils including input coil L1, first intermediate coil Lm1, output coil L2 and second intermediate coil Lm2, and current flows from the input side of DC power source E to the output side of resistor R. Here, charging current flows through first intermediate capacitor C1 in the direction opposite to the illustration of FIG. 4A in which switch S is turned on. Current also flows through second intermediate capacitor C2 in the direction opposite to the illustration of FIG. 4A in which the switch is turned on. Specifically, charging current flows through one end of second intermediate capacitor C2 and discharging current flows through the other end of second intermediate capacitor C2.

In addition, although described more fully later, for example, when both input coil L1 and output coil L2 have the same inductance (L1=L2=L) and when both first intermediate coil Lm1 and second intermediate coil Lm2 have the same inductance (Lm1=Lm2=Lm), ripple voltages_ at the nodes are determined using Equation 3 below:

$$\left.\begin{aligned} Va &= Vi + \frac{Vo}{2} \\ Vb &= \frac{Vo}{2} \\ Vc &= \frac{Vo}{2} \\ Vd &= -\frac{Vo}{2} \end{aligned}\right\}, \quad \text{Equation 4}$$

where Va is a ripple voltage at connection point a between input coil L1 and switch S, Vb is a ripple voltage at connection point b between first intermediate capacitor C1 and first intermediate coil Lm1, Vc is a ripple voltage at connection point c between switch S and output coil L2, and Vd is a ripple voltage at connection point d between second intermediate capacitor C2 and second intermediate coil Lm2.

As shown in FIGS. 4A and 4B, current flows through all the coils including input coil L1, first intermediate coil Lm1, output coil L2 and second intermediate coil Lm2 irrespective of whether switch S is turned on or off. The current waveform, particularly, the ripple current waveform flowing through the coil is a triangle wave that rises on the right when switch S is turned on but descends on the right when switch S is turned off. The current waveform does not become a pulse wave that sharply rises and descends.

Ripple currents IL1, ILm1, IL2 and ILm2 flow through the coils including input coil L1, first intermediate coil Lm1, output coil L2 and second intermediate coil Lm2, respectively. As shown in FIG. 4C, all currents have a sine waveform corresponding to the on/off switching period of switch S when electromagnetic coupling exists neither between input coil L1 and first intermediate coil Lm1 nor between output coil L2 and second intermediate coil Lm2 (corresponding to (a) of a ripple current block in FIG. 4C), when electromagnetic coupling exists only between input coil L1 and first intermediate coil Lm1 (corresponding to (b) of the ripple current block in FIG. 4C), when electromagnetic coupling exists only between output coil L2 and second intermediate coil Lm2 (corresponding to (c) of the ripple current block in FIG. 4C), and when electromagnetic coupling exists both between input coil L1 and first intermediate coil Lm1 and between output coil L2 and second intermediate coil Lm2 (corresponding to (d) of the ripple current block in FIG. 4C).

For example, when input coil L1 and output coil L2 have the same inductance (L1=L2=L) and when first intermediate coil Lm1 and second intermediate coil Lm2 have the same inductance (Lm1=Lm2=Lm), as shown in FIG. 4C, the peak values of respective ripple currents IL1, ILm1, IL2 and ILm2 are given by Equation 5 below:

$$\left.\begin{aligned} \Delta IL1 &= \frac{(Vi - Vo) \times \text{ton}}{2 \times L} \\ \Delta ILm1 &= \frac{(Vi - Vo) \times \text{ton}}{2 \times Lm} \\ \Delta IL2 &= \frac{(Vi - Vo) \times \text{ton}}{2 \times L} \\ \Delta ILm2 &= \frac{(Vi - Vo) \times \text{ton}}{2 \times Lm} \end{aligned}\right\}, \quad \text{Equation 5}$$

where ton is the on-time of switch S in the case where electromagnetic coupling exists neither between input coil L1 and first intermediate coil Lm1 nor between output coil L2 and second intermediate coil Lm2 (corresponding to (a) of the ripple current block in FIG. 4C). Details of the peak values of the ripple currents will be described later.

In addition, in the case where electromagnetic coupling exists only between input coil L1 and first intermediate coil Lm1 (corresponding to (b) of the ripple current block in FIG. 4C), in the case where electromagnetic coupling exists only between output coil L2 and second intermediate coil Lm2 (corresponding to (c) of the ripple current block in FIG. 4C), and in the case where electromagnetic coupling exists between both input coil L1 and first intermediate coil Lm1 and between output coil L2 and the second intermediate coil Lm2 (corresponding to (d) of the ripple current block in FIG. 4C), as shown in FIG. 4C, the peak values of ripple currents IL1, ILm1, IL2 and ILm2 are given by following Equations 6, 7 and 7, respectively:

$$\left.\begin{aligned} \Delta IL1 &\cong 0 \\ \Delta ILm1 &= \frac{(Vi - Vo) \times \text{ton}}{2 \times Lm} \\ \Delta IL2 &= \frac{(Vi - Vo) \times \text{ton}}{2 \times L} \\ \Delta ILm2 &= \frac{(Vi - Vo) \times \text{ton}}{2 \times Lm} \end{aligned}\right\}, \quad \text{Equation 6}$$

$$\left.\begin{aligned} \Delta IL1 &= \frac{(Vi - Vo) \times \text{ton}}{2 \times L} \\ \Delta ILm1 &= \frac{(Vi - Vo) \times \text{ton}}{2 \times Lm} \\ \Delta IL2 &\cong 0 \\ \Delta ILm2 &= \frac{(Vi - Vo) \times \text{ton}}{2 \times Lm} \end{aligned}\right\}, \text{ and} \quad \text{Equation 7}$$

$$\left.\begin{aligned} \Delta IL1 &\cong 0 \\ \Delta ILm1 &= \frac{(Vi - Vo) \times \text{ton}}{2 \times Lm} \\ \Delta IL2 &\cong 0 \\ \Delta ILm2 &= \frac{(Vi - Vo) \times \text{ton}}{2 \times Lm} \end{aligned}\right\}, \quad \text{Equation 8}$$

where ton is the on-time of switch S. When input coil L and first intermediate coil Lm1 are electromagnetically coupled and when output coil L2 and second intermediate coil Lm2 are electromagnetically coupled, the coupling coefficients k11 and k22 and turn ratios n11 and n22 are determined according to Equations 1 and 2 above.

In addition, both-end voltages VL1, VLm1, VL2 and VLm2 are applied to both ends of input coil L1, first intermediate coil Lm1, output coil L2 and second intermediate coil Lm2, respectively. As shown in FIG. 4C, for example, in the case where input coil L1 and output coil L2 have the same inductance (L1=L2=L) and where first intermediate coil Lm1 and second intermediate coil Lm2 have the same inductance (Lm1=Lm2=Lm), both-end voltages VL1, VLm1, VL2 and VLm2 are determined according to Equation 9 below when switch S is turned on and according to Equation 10 below when switch S is turned off (details will be described later).

$$VL1 = \frac{(Vi - Vo)}{2}$$
$$VLm1 = \frac{(Vi - Vo)}{2}$$
$$VL2 = \frac{(Vi - Vo)}{2}$$
$$VLm2 = \frac{(Vi - Vo)}{2}$$

Equation 9

$$VL1 = -\frac{Vo}{2}$$
$$VLm1 = -\frac{Vo}{2}$$
$$VL2 = -\frac{Vo}{2}$$
$$VLm2 = -\frac{Vo}{2}$$

Equation 10

Now, a more detailed description will be given of performance analysis of the step-down switching DC-DC converter according to an exemplary embodiment of the present invention shown in FIGS. 3 and 4A through 4C. In the performance analysis, it shall be assumed that switch S is an ideal switch, the diode of the switching device is an ideal diode, ton is the on-time of switch S and toff is the off-time of switch S in a switching frequency f where step-down switching DC-DC converter performs switching. In addition, it shall be assumed that the impedances of first intermediate capacitor C1 and second intermediate capacitor C2 in switching frequency f are sufficiently small (that is, capacitances are sufficiently large), that first intermediate capacitor C1 is regarded as a voltage source of voltage Vi, which is the same as the input voltage, and second intermediate capacitor C2 is regarded as a voltage source of a voltage Vo, which is the same as the output voltage.

(a) When Switch S is ON

Firstly, in the state where switch S is turned on, the relationship of potentials Va, Vb, Vc and Vd at the nodes to the magnitudes of ripple currents $\Delta IL1$, $\Delta IL2$, $\Delta ILm1$ and $\Delta ILm2$ at input coil L1, output coil L2, first intermediate coil Lm1 and second intermediate coil Lm2 of the step-down switching DC-DC converter are determined by Equation 11 below:

$$Vb = Va - Vi$$
$$Vc = Va$$
$$Vd = Va - Vo$$
$$\Delta IL1 + \Delta ILm1 = \Delta ILm2 + \Delta IL2$$

Equation 11

Here, regarding the potentials at the nodes, as described above, potential Va is ripple voltage Va at connection point "a" at which input coil L1 and switch S are connected to each other, potential Vb is ripple voltage Vb at connection point "b" at which first intermediate capacitor C1 and first intermediate coil Lm1 are connected to each other, potential Vc is ripple voltage Vc at connection point "c" at which switch S and output coil L2 are connected to each other, and potential Vd is ripple voltage Vd at connection point "d" at which second intermediate capacitor C and second intermediate coil Lm2 are connected to each other.

In Equation 11 above, the magnitudes of ripple currents $\Delta IL1$, $\Delta IL2$, $\Delta ILm1$ and $\Delta ILm2$ of input coil L1, output coil L2, first intermediate coil Lm1 and second intermediate coil Lm2 are determined by Equation 12 below:

$$\Delta IL1 = \left\{ \frac{\left(\frac{1}{L2} + \frac{1}{Lm2}\right)}{\left(\frac{1}{L1} + \frac{1}{Lm1} + \frac{1}{L2} + \frac{1}{Lm2}\right)} \right\} \times \frac{(Vi - Vo) \times ton}{L1} \Rightarrow \frac{(Vi - Vo) \times ton}{2 \times L1}$$

$$\Delta ILm1 = \left\{ \frac{\left(\frac{1}{L2} + \frac{1}{Lm2}\right)}{\left(\frac{1}{L1} + \frac{1}{Lm1} + \frac{1}{L2} + \frac{1}{Lm2}\right)} \right\} \times \frac{(Vi - Vo) \times ton}{Lm1} \Rightarrow \frac{(Vi - Vo) \times ton}{2 \times Lm1}$$

$$\Delta IL2 = \left\{ \frac{\left(\frac{1}{L1} + \frac{1}{Lm1}\right)}{\left(\frac{1}{L1} + \frac{1}{Lm1} + \frac{1}{L2} + \frac{1}{Lm2}\right)} \right\} \times \frac{(Vi - Vo) \times ton}{L2} \Rightarrow \frac{(Vi - Vo) \times ton}{2 \times L2}$$

$$\Delta ILm2 = \left\{ \frac{\left(\frac{1}{L1} + \frac{1}{Lm1}\right)}{\left(\frac{1}{L1} + \frac{1}{Lm1} + \frac{1}{L2} + \frac{1}{Lm2}\right)} \right\} \times \frac{(Vi - Vo) \times ton}{Lm2} \Rightarrow \frac{(Vi - Vo) \times ton}{2 \times Lm2}$$

Equation 12 where the terms that follow the mark "⇒" represent the case where input coil L1 and the output coil L2 have the same inductance (L1=L2) and where first intermediate coil Lm1 and second intermediate coil Lm2 have the same inductance (Lm1=Lm2).

In addition, the potentials Va, Vb, Vc and Vd at the nodes are determined according to Equation 13 below:

$$Va = \left\{ \frac{\left(\frac{1}{L1} + \frac{1}{Lm1}\right) \times Vi + \left(\frac{1}{L2} + \frac{1}{Lm2}\right) \times Vo}{\left(\frac{1}{L1} + \frac{1}{Lm1} + \frac{1}{L2} + \frac{1}{Lm2}\right)} \right\} \Rightarrow \frac{(Vi+Vo)}{2}$$

$$Vb = \left\{ \frac{\left(\frac{1}{L2} + \frac{1}{Lm2}\right) \times (Vo - Vi)}{\left(\frac{1}{L1} + \frac{1}{Lm1} + \frac{1}{L2} + \frac{1}{Lm2}\right)} \right\} \Rightarrow \frac{-(Vi-Vo)}{2}$$

$$Vc = \left\{ \frac{\left(\frac{1}{L1} + \frac{1}{Lm1}\right) \times Vi + \left(\frac{1}{L2} + \frac{1}{Lm2}\right) \times Vo}{\left(\frac{1}{L1} + \frac{1}{Lm1} + \frac{1}{L2} + \frac{1}{Lm2}\right)} \right\} \Rightarrow \frac{(Vi+Vo)}{2}$$

$$Vd = \left\{ \frac{\left(\frac{1}{L1} + \frac{1}{Lm1}\right) \times (Vi - Vo)}{\left(\frac{1}{L1} + \frac{1}{Lm1} + \frac{1}{L2} + \frac{1}{Lm2}\right)} \right\} \Rightarrow \frac{(Vi-Vo)}{2}$$

Equation 13 where the terms that follow the mark "⇒" represent the case where input coil L1 and output coil L2 have the same inductance (L1=L2) and where first intermediate coil Lm1 and second intermediate coil Lm2 have the same inductance (Lm1=Lm2).

Both-end voltages VL1, VLm1, VLm2 and VL2 of input coil L1, output coil L2, first intermediate coil Lm1 and second intermediate coil Lm2 are determined by Equation 14 below:

$$VL1 = \left\{ \frac{\left(\frac{1}{L2} + \frac{1}{Lm2}\right) \times (Vi - Vo)}{\left(\frac{1}{L1} + \frac{1}{Lm1} + \frac{1}{L2} + \frac{1}{Lm2}\right)} \right\} \Rightarrow \frac{(Vi-Vo)}{2}$$

$$VLm1 = \left\{ \frac{\left(\frac{1}{L2} + \frac{1}{Lm2}\right) \times (Vi - Vo)}{\left(\frac{1}{L1} + \frac{1}{Lm1} + \frac{1}{L2} + \frac{1}{Lm2}\right)} \right\} \Rightarrow \frac{(Vi-Vo)}{2}$$

$$VL2 = \left\{ \frac{\left(\frac{1}{L1} + \frac{1}{Lm1}\right) \times (Vi - Vo)}{\left(\frac{1}{L1} + \frac{1}{Lm1} + \frac{1}{L2} + \frac{1}{Lm2}\right)} \right\} \Rightarrow \frac{(Vi-Vo)}{2}$$

$$VLm2 = \left\{ \frac{\left(\frac{1}{L1} + \frac{1}{Lm1}\right) \times (Vi - Vo)}{\left(\frac{1}{L1} + \frac{1}{Lm1} + \frac{1}{L2} + \frac{1}{Lm2}\right)} \right\} \Rightarrow \frac{(Vi-Vo)}{2}$$

Equation 14 where the terms that follow the mark "⇒" represent the case where input coil L1 and output coil L2 have the same inductance (L1=L2) and where first intermediate coil Lm1 and second intermediate coil Lm2 have the same inductance (Lm1=Lm2).

(b) When Switch S is OFF

When the switch S is turned off, the relationship of potentials Va, Vb, Vc and Vd at the nodes to the magnitudes of ripple currents ΔIL1, ΔIL2, ΔILm1 and ΔILm2 at input coil L1, output coil L2, first intermediate coil Lm1 and second intermediate coil Lm2 of the step-down switching DC-DC converter are determined by Equation 15:

$$\begin{aligned} Vb &= Va - Vi \\ Vc &= Va - Vi \\ Vd &= Va - Vi - Vo \\ \Delta IL1 + \Delta ILm1 &= \Delta ILm2 + \Delta IL2 \end{aligned}$$

Equation 15 where the magnitudes of ripple currents ΔIL1, ΔIL2, ΔILm1 and ΔILm2 of input coil L1, output coil L2, first intermediate coil Lm1 and second intermediate coil Lm2 are determined by Equation 16 below:

$$\Delta IL1 = \left\{ \frac{\left(\frac{1}{L2} + \frac{1}{Lm2}\right)}{\left(\frac{1}{L1} + \frac{1}{Lm1} + \frac{1}{L2} + \frac{1}{Lm2}\right)} \right\} \times \frac{Vo \times toff}{L1} \Rightarrow \frac{Vo \times toff}{2 \times L1}$$

$$\Delta ILm1 = \left\{ \frac{\left(\frac{1}{L2} + \frac{1}{Lm2}\right)}{\left(\frac{1}{L1} + \frac{1}{Lm1} + \frac{1}{L2} + \frac{1}{Lm2}\right)} \right\} \times \frac{Vo \times toff}{Lm1} \Rightarrow \frac{Vo \times toff}{2 \times Lm1}$$

$$\Delta IL2 = \left\{ \frac{\left(\frac{1}{L1} + \frac{1}{Lm1}\right)}{\left(\frac{1}{L1} + \frac{1}{Lm1} + \frac{1}{L2} + \frac{1}{Lm2}\right)} \right\} \times \frac{Vo \times toff}{L2} \Rightarrow \frac{Vo \times toff}{2 \times L2}$$

$$\Delta ILm2 = \left\{ \frac{\left(\frac{1}{L1} + \frac{1}{Lm1}\right)}{\left(\frac{1}{L1} + \frac{1}{Lm1} + \frac{1}{L2} + \frac{1}{Lm2}\right)} \right\} \times \frac{Vo \times toff}{Lm2} \Rightarrow \frac{Vo \times toff}{2 \times Lm2}$$

Equation 16 where the terms that follow the mark "⇒" represent the case where input coil L1 and output coil L2 have the same inductance (L1=L2) and where first intermediate coil Lm1 and second intermediate coil Lm2 have the same inductance (Lm1=Lm2).

In addition, the potentials Va, Vb, Vc and Vd at the nodes are determined according to Equation 17 below:

$$Va = Vi + \left\{ \frac{\left(\frac{1}{L2} + \frac{1}{Lm2}\right) \times Vo}{\left(\frac{1}{L1} + \frac{1}{Lm1} + \frac{1}{L2} + \frac{1}{Lm2}\right)} \right\} \Rightarrow Vi + \frac{Vo}{2}$$

$$\Delta ILm1 = \left\{ \frac{\left(\frac{1}{L2} + \frac{1}{Lm2}\right) \times Vo}{\left(\frac{1}{L1} + \frac{1}{Lm1} + \frac{1}{L2} + \frac{1}{Lm2}\right)} \right\} \Rightarrow \frac{Vo}{2}$$

$$\Delta IL2 = \left\{ \frac{\left(\frac{1}{L1} + \frac{1}{Lm1}\right) \times Vo}{\left(\frac{1}{L1} + \frac{1}{Lm1} + \frac{1}{L2} + \frac{1}{Lm2}\right)} \right\} \Rightarrow \frac{Vo}{2}$$

$$\Delta ILm2 = -\left\{ \frac{\left(\frac{1}{L1} + \frac{1}{Lm1}\right) \times Vo}{\left(\frac{1}{L1} + \frac{1}{Lm1} + \frac{1}{L2} + \frac{1}{Lm2}\right)} \right\} \Rightarrow -\frac{Vo}{2}$$

Equation 17 where the terms that follow the mark "⇒" represent the case where input coil L1 and the output coil L2 have the same inductance (L1=L2) and where first intermediate coil Lm1 and second intermediate coil Lm2 have the same inductance (Lm1=Lm2).

Both-end voltages VL1, VLm1, VLm2 and VL2 of input coil L1, output coil L2, first intermediate coil Lm1 and second intermediate coil Lm2 are determined by Equation 18 below:

$$VL1 = \frac{-\left\{\left(\frac{1}{L2} + \frac{1}{Lm2}\right) \times Vo\right\}}{\left(\frac{1}{L1} + \frac{1}{Lm1} + \frac{1}{L2} + \frac{1}{Lm2}\right)} \Rightarrow -\frac{Vo}{2}$$

$$VLm1 = \frac{-\left\{\left(\frac{1}{L2} + \frac{1}{Lm2}\right) \times Vo\right\}}{\left(\frac{1}{L1} + \frac{1}{Lm1} + \frac{1}{L2} + \frac{1}{Lm2}\right)} \Rightarrow -\frac{Vo}{2}$$

$$\Delta IL2 = \frac{-\left\{\left(\frac{1}{L1} + \frac{1}{Lm1}\right) \times Vo\right\}}{\left(\frac{1}{L1} + \frac{1}{Lm1} + \frac{1}{L2} + \frac{1}{Lm2}\right)} \Rightarrow -\frac{Vo}{2}$$

$$\Delta ILm2 = \frac{-\left\{\left(\frac{1}{L1} + \frac{1}{Lm1}\right) \times Vo\right\}}{\left(\frac{1}{L1} + \frac{1}{Lm1} + \frac{1}{L2} + \frac{1}{Lm2}\right)} \Rightarrow -\frac{Vo}{2}$$

Equation 18 where the terms the follows the mark "⇒" represent the case where the input coil L1 and output coil L2 have the same inductance (L1=L2) and where first intermediate coil Lm1 and second intermediate coil Lm2 have the same inductance (Lm1=Lm2).

Here, the magnitudes of ripple currents ΔIL1, ΔIL2, ΔILm1 and ΔILm2 and both-end voltages VL1, VLm1, VLm2 and VL2 of input coil L1, output coil L2, first intermediate coil Lm1 and second intermediate coil Lm2 are required to be the same both in the case where switch S is turned on and in the case where the switch is turned off such that the step-down switching DC-DC converter can normally operate. Furthermore, the magnitudes of ripple currents ΔIL1, ΔIL2, ΔILm1 and ΔILm2 and both-end voltages VL1, VLm1, VLm2 and VL2 are required to satisfy Equation 19 below:

$$\Delta I[\,](ON) = \Delta I[\,](OFF) \quad \ldots 9\text{-}1$$
$$V[\,](ON) = V[\,](OFF) \quad \ldots 9\text{-}2$$

Equation 19 where the mark "[ ]" represents any of the symbols L1, Lm1, L2 and Lm2 of the coils, and the marks "ON" and "OFF" represent the on and off states of the switch S. Specifically, the upper part 9-1 of Equation 19 above indicates:
Equation 12=Equation 16
The lower part 9-2 of Equation 19 above indicates:
Equation 14=Equation 18
Equation 19 above can be rewritten into Equation 20 below:

$$Vo = Vi \times \frac{ton}{(ton + toff)} = Vi \times d \text{ where,}$$

Equation 20

-continued $$d = \frac{ton}{(ton + toff)}.$$

From Equation 20 above, it can be seen that the step-down switching DC-DC converter shown in FIGS. 3 and 4A through 4C operates as a step-down converter that produces output voltage Vo based on the on-time ratio of the switch S with respect to input voltage Vi. Specifically, the step-down switching DC-DC converter shown in FIG. 3 operate as a step-down converter, and ripple currents ΔIL1 and ΔIL2 of input coil L1 and the output coil L2 are a triangle wave that gradually rises from the time point where switch S is converted from the off state to the on state but gradually descends from the time point where switch S is converted from the on state to the off state.

Below, a further description will be given of a method of reducing or eliminating input/output ripple currents using the step-down switching DC-DC converter of the present invention.

FIG. 5 is a diagram illustrating a method of reducing ripple currents and a concept of eliminating ripples in a typical step-down switching DC-DC converter. FIG. 5 also illustrates operational effects obtained by electromagnetically coupling two coils to which the same both-end voltage is applied.

In general, when the same both-end voltage of a square wave occurs synchronous with a switching frequency and when ripple currents of a triangle wave flow through coils L1 and L2 as indicated with item 1 in FIG. 5, if the two coils L1 and L2 are electromagnetically coupled with each other with unipolarity as indicated with the item 2 in FIG. 5, an equivalent circuit will be obtained as indicated with the item 3 in FIG. 5. Specifically, in the two coils L1 and L2, if the turn ratio is n and if the coupling coefficient of electromagnetic coupling is k, Equation 21 below will produce an equivalent circuit of coils having mutual inductance M, in which a circuit of coil L1' having inductance L1-M is coupled with a circuit of coil L2' having inductance L2-M.

$$M = k\sqrt{L1 \times L2} \left( \text{turn ratio } n = \sqrt{\frac{L1}{L2}} \right)$$

Equation 21

In this case, as in item 3-1 of FIG. 5, when coupling coefficient k and turn ratio n have the relationship:

k=n=1, both coils L1 and L2 have the same inductance (L1=L2=L), and mutual inductance M is the same as the inductance of coils L1 and L2 (M=L=L1=L2). As a result, inductance L1-M of coil L1' and inductance L2-M of coil L2' on the equivalent circuit are substantially zero (0), and the ripple currents of coils L1 and L2 can be halved from values before electromagnetic coupling.

In addition, when the coupling coefficient and the turn ratio have the relationship:

$$0 \leq k = n \leq 1$$

as indicated with item 3-2 in FIG. 5, mutual inductance M is the same as the inductance of coil L1 as expressed in Equation 22 below. Since inductance L1-M of the coil L1' on equivalent coil is substantially zero (0), inductance L2-M of coil L2' is left as L2-L1, and the both-end voltage of the coil L2' is always zero (0), or, due to the relationship:

impedance on coil L1' ≪ impedance on coil L2', the ripple current of coil L2 can be eliminated (or the coil L2 can have zero ripples) while the ripple current of coil L1 is the same as before electromagnetic coupling.

$$M = k\sqrt{L1 \times L2} = \sqrt{\frac{L1}{L2}} \times \sqrt{L1 \times L2} = L1 \quad \text{Equation 22}$$

In addition, as indicated with the item 3-3 in FIG. 5, when the coupling coefficient and the turn ratio have the relationship:

$0 \leq k = 1/n \leq 1$, mutual inductance M is substantially the same as the inductance of coil L2 as expressed in Equation 23 below. Since inductance L2-M of coil L2' on the equivalent circuit is substantially zero (0), inductance L1-M of coil L1' is left as L1-L2, and the both-end voltage of coil L1' is always zero (0), or, due to the relationship:

impedance on coil L1' ≫ impedance on coil L2', the ripple current of coil L1 can be eliminated (or coil L1 can have zero ripples) while the ripple current of coil L2 is the same as before electromagnetic coupling.

$$M = k\sqrt{L1 \times L2} = \left(\frac{1}{\sqrt{\frac{L1}{L2}}}\right) \times \sqrt{L1 \times L2} = L2 \quad \text{Equation 23}$$

Thus, it is difficult to simultaneously eliminate or reduce the ripple currents of coils L1 and L2 using a technique that electromagnetically couples coils L1 and L2 with each other, wherein coil L1 forms the input and coil L2 forms the output as shown in FIG. 5.

In contrast, in the step-down switching DC-DC converter according to an exemplary embodiment of the invention as shown in FIG. 3, it yields:

VL1=VLm1

VL2=VLm2

Thus, both-end voltages VL1 and VLm1 of input and first intermediate coils L1 and Lm1 are always the same and both-end voltages VL2 and VLm2 of output and second intermediate coils L2 and Lm2 are always the same irrespective of whether switch S is on or off as illustrated in FIGS. 4A through 4C and expressed in Equations 14 and 18.

In particular, input coil L1 and output coil L2 have the same inductance, and first intermediate coil Lm1 and second intermediate coil Lm2 have the same inductance as expressed in the following relations:

*L*1=*L*2 (inductance of *L*1=inductance of *L*2)

*Lm*1=*Lm*2 (inductance of *Lm*1=inductance of *Lm*2)

Then, both-end voltages VL1, VLm1, VL2 and VLm2 of the coils including input coil L1, the output coil L2, first intermediate coil Lm1 and second intermediate coil Lm2 can be the same irrespective of whether switch S is turned on or off. In addition, the coils can have the same both-end voltage waveform as expressed in the following relation:

VL1=VLm1=Lm1=Lm2

Accordingly, the ripple currents of the input coil L1 and/or the output coil L2 can be reduced or eliminated (to realize zero ripples) by properly coupling the coils with each other. As described above, FIG. 4C illustrates the ripple current waveform in which ripples are eliminated from only the current that flows through input coil L1 by electromagnetically coupling two coils such as input coil L1 and first intermediate coil Lm1 with each other, the ripple current waveform in which ripples are eliminated from only the current flowing through output coil L2 by electromagnetically coupling two coils such as output coil L2 and second intermediate coil Lm2 with each other, and the ripple current waveform in which ripples are eliminated from the current that flows through both input coil L1 and output coil L2 by electromagnetically coupling the input coil L1 and the first intermediate coil Lm1 with each other and output coil L2 and the second intermediate coil Lm2 with each other.

When coils are combined in a different fashion, for example, when input coil L1 and the second intermediate coil Lm2 are coupled with each other and when output coil L2 and the first intermediate coil Lm1 are coupled with each other, the same effects can be obtained. In this case, the current that flows through input coil L1 and output coil L2 can be eliminated (to realize zero ripples) by setting input coil L1 and second intermediate coil Lm2 to have the same turn ratio n12 and the same coupling coefficient k12 of electromagnetic coupling, and by setting output coil L2 and the first intermediate coil Lm1 to have the same turn ratio n21 and the same coupling coefficient k21 of electromagnetic coupling.

Embodiment of the Invention

Figure 6:
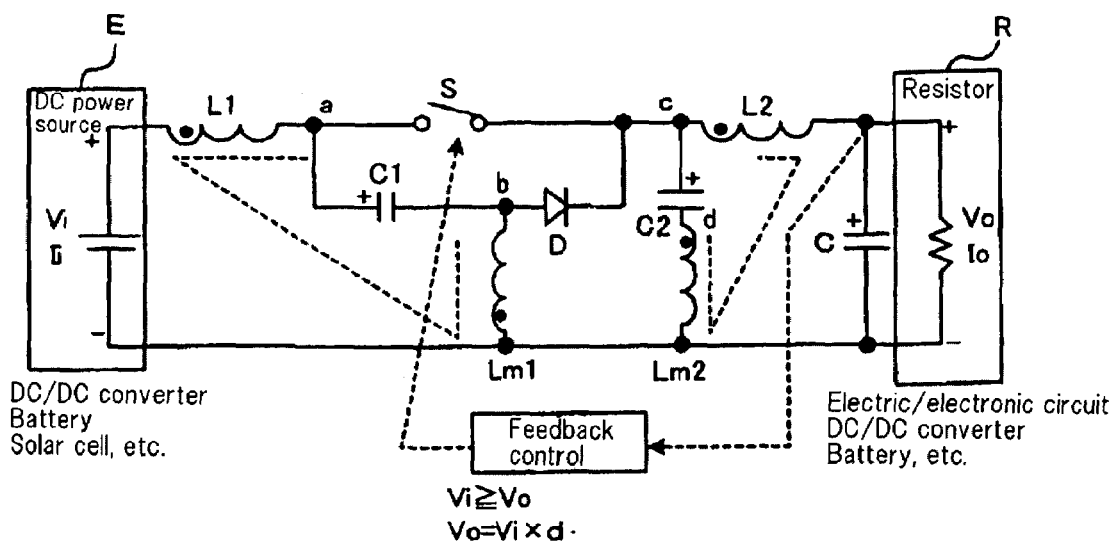
FIG. 6 is a circuit diagram illustrating an exemplary configuration in which the step-down switching DC-DC converter according to the present invention is placed between a DC power source E and a resistor R.

FIG. 6 is a circuit diagram illustrating an exemplary configuration in which the step-down switching DC-DC converter according to the present invention is placed between DC power source E and resistor R.

As shown in FIG. 6, a voltage from DC power source E such as a DC-DC converter, a battery or a solar cell is stepped down and stabilized by the step-down switching DC-DC converter of the present invention before being supplied to resistor R (acting as a load) such as an electric/electronic circuit, a DC-DC converter or a battery. Here, the step-down switching DC-DC converter as shown in FIGS. 3 and 4A through 4C performs, via voltage conversion control, an operation of controlling the on time ton of the switch by feeding back output voltage Vo that it will become a predetermined voltage.

Likewise the above-described circuit, the circuit shown in FIG. 6 can also eliminate ripple currents from the input coil L1 and output coil L2 by properly coupling two coils such as input coil L1 and first intermediate coil Lm1 and by coupling two coils such as output coil L2 and second intermediate coil Lm2.

Operation Waveform of Embodiment

Below, with reference to diagrams of FIGS. 7A, 7B, 8A and 8B illustrating operation waveforms, a description will be given of the operation of the step-down switching DC-DC converter, as shown in FIG. 3, which includes the input coil L1, output coil L2, first intermediate coil Lm1, second intermediate coil Lm2, first intermediate capacitor C1, second intermediate capacitor C2, switch S, diode D and output capacitor C. The step-down switching DC-DC converter can control the on time of switch S by feeding back output voltage Vo, thereby converting the ripple current waveforms of input and output coils L1 and L2 into a triangle wave or eliminating the ripple current waveforms.

In this case, FIGS. 7A, 7B, 8A and 8B illustrate operation waveforms according to circuit simulation results in the following relationships:

Vi=120 V

Vo=50 V $L1=L2=118\ \mu H(=L)$ $Lm1=Lm2=50\ \mu H(=Lm)$ $C1=C2=5\ \mu F$ $C=100\ \mu F$

S=ideal switch

D=ideal diode

Switching frequency=100 kHz ton=4.17 μs

According to the above relationships, all ripple currents at the input and output coils L1 and L2 can be eliminated.

Figure 7A:
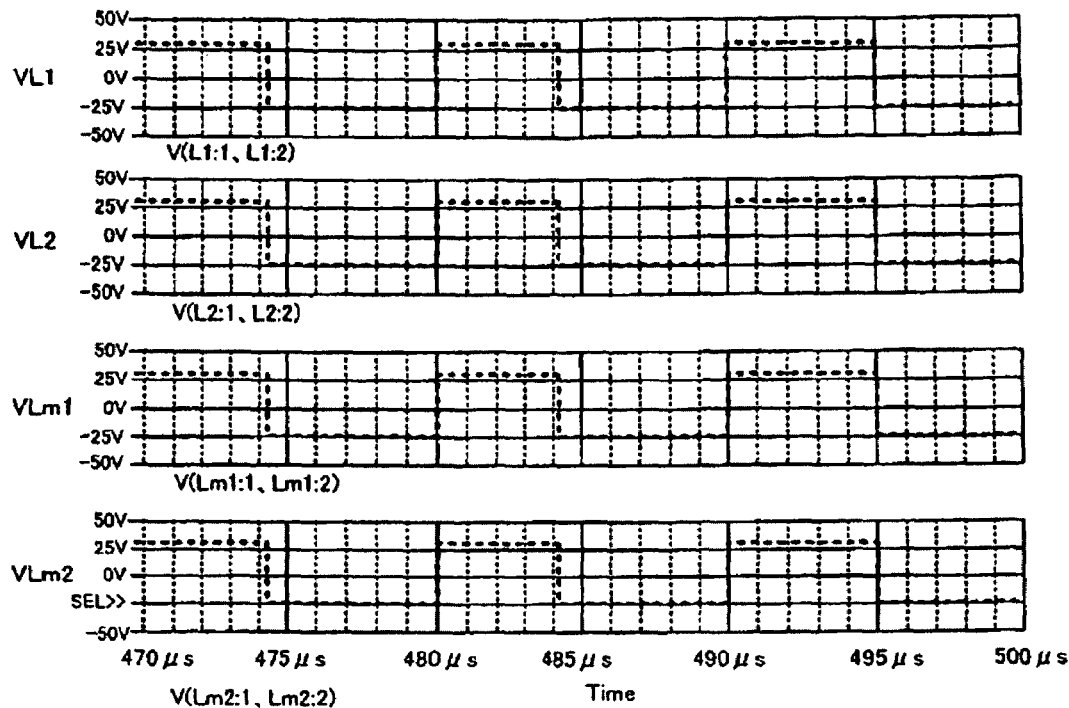
FIG. 7A is a diagram illustrating operation waveforms according to a simulation result of both-end voltages of the input coil, output coil, first intermediate coil and second intermediate coil in the step-down switching DC-DC converter shown in FIG. 3 in the case where no electromagnetic coupling exists between the coils.
Figure 7B:
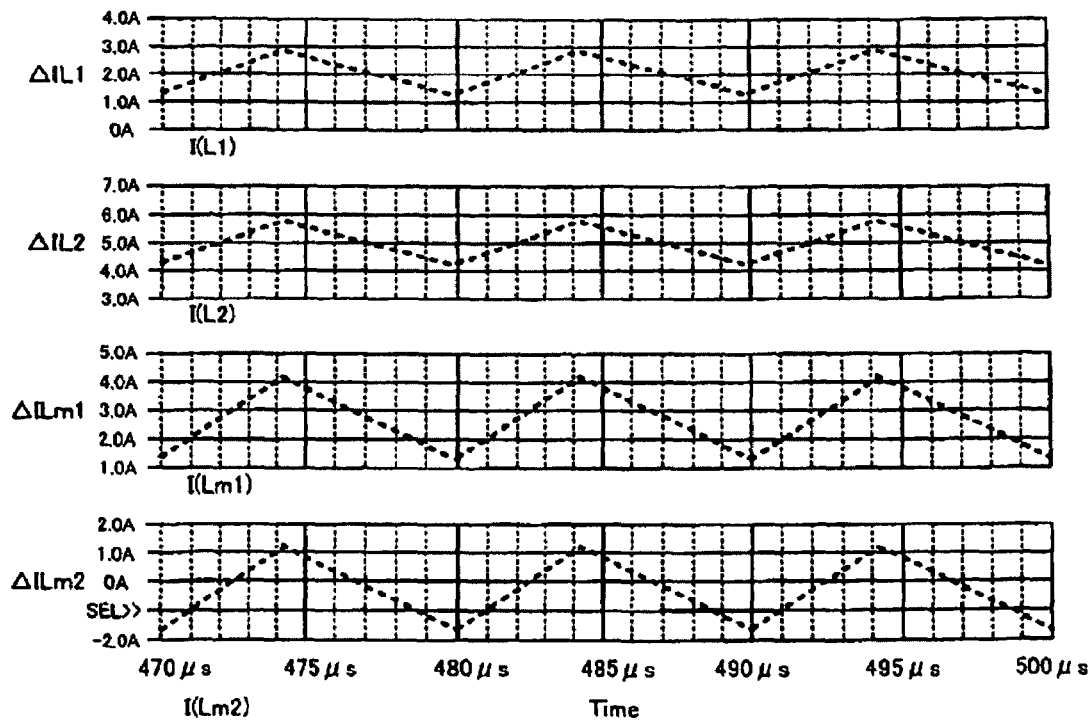
FIG. 7B is a diagram illustrating operation waveforms according to a simulation result of ripple currents of the input coil, output coil, first intermediate coil and second intermediate coil in the step-down switching DC-DC converter shown in FIG. 3 in the case where no electromagnetic coupling exists between the coils.

Unlike the embodiment shown in FIG. 6 or the above-described embodiment of the step-down switching DC-DC converter shown in FIG. 3, FIGS. 7A and 7B are diagrams illustrating operation waveforms according to simulation results in the case where electromagnetic coupling exists neither between input and first intermediate coils L1 and Lm1 nor between output and second intermediate coils L2 and Lm2. Specifically, FIG. 7A illustrates the operation waveforms of both-end voltages VL1, VL2, VLm1 and VLm2 at input, output, first intermediate and second intermediate coils L1, L2, Lm1 and Lm2, and FIG. 7B illustrates the operation waveforms of ripple currents $\Delta IL1$, $\Delta IL2$, $\Delta ILm1$ and $\Delta ILm2$ at input, output, first intermediate and second intermediate coils L1, L2, Lm1 and Lm2.

According to the simulation results shown in FIG. 7A, all the both-end voltages VL1, VL2, VLm1 and VLm2 at input, output, first intermediate and second intermediate coils L1, L2, Lm1 and Lm2 are the same. That is, when switch S is turned on, as expressed in Equation 14 above, it yields:

$VL1=VL2=VLm1=VLm2=(Vi-Vo)\div 2\approx 35V$

When switch S is turned off, as expressed in Equation 18 above, it yields:

$VL1=VL2=VLm1=VLm2=-Vo\div 2\approx 25V$

In addition, regarding ripple currents $\Delta IL1$, $\Delta IL2$, $\Delta ILm1$ and $\Delta ILm2$ at input, output, first intermediate and second intermediate coils L1, L2, Lm1 and Lm2 according to the simulation results shown in FIG. 7B, when switch S is turned on, as expressed in Equation 12 above, it yields:

$\Delta IL1=\Delta IL2=(Vi-Vo)\times ton\div(2\times L)\approx 1.2\ A$ $\Delta ILm1=\Delta ILm2=(Vi-Vo)\times ton\div(2\times Lm)\approx 2.9\ A$ When switch S is turned off, as expressed in Equation 16 above, it yields:

$$\Delta IL1 = \Delta IL2 = Vo \times toff \div (2 \times L)$$
$$= Vo \times (10 - ton) \div (2 \times L) \approx 1.2A$$

$$\Delta ILm1 = \Delta ILm2 = Vo \times toff \div (2 \times Lm)$$
$$= Vo \times (10 - ton) \div (2 \times Lm) \approx 2.9A$$

These values are the same irrespective of whether switch S is on or off.

Figure 8A:
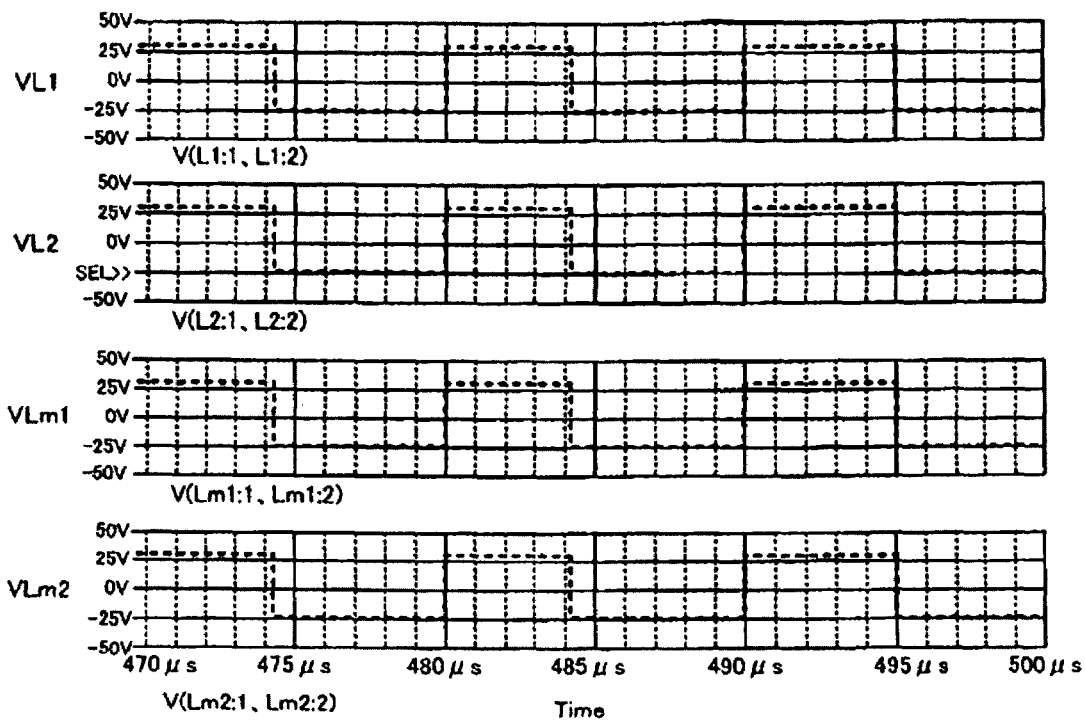
FIG. 8A is a diagram illustrating operation waveforms according to a simulation result of both-end voltages of the input coil, output coil, first intermediate coil and second intermediate coil in the step-down switching DC-DC converter shown in FIG. 3 in the case where an electromagnetic coupling exists between the coils.
Figure 8B:
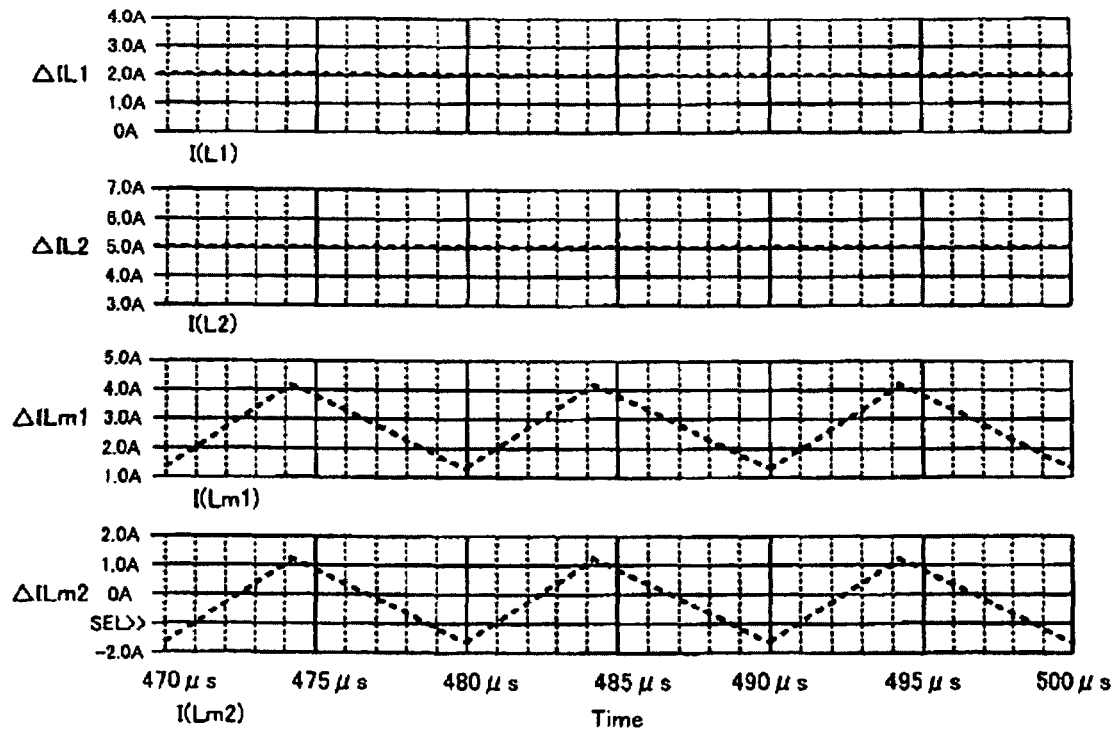
FIG. 8B is a diagram illustrating operation waveforms according to a simulation result of ripple currents of the input coil, output coil, first intermediate coil and second intermediate coil in the step-down switching DC-DC converter shown in FIG. 3 in the case where electromagnetic coupling exists between the coils.

Unlike the embodiment shown in FIG. 6 or the above-described embodiment of the step-down switching DC-DC converter shown in FIG. 3, FIGS. 8A and 8B are diagrams illustrating operation waveforms according to simulation results in the case where electromagnetic coupling exists between input and first intermediate coils L1 and Lm1 and between output and second intermediate coils L2 and Lm2. Specifically, FIG. 8A illustrates the operation waveforms of both-end voltages VL1, VL2, VLm1 and VLm2 at input, output, first intermediate and second intermediate coils L1, L2, Lm1 and Lm2, and FIG. 8B illustrates the operation waveforms of ripple currents $\Delta IL1$, $\Delta IL2$, $\Delta ILm1$ and $\Delta ILm2$ at input, output, first intermediate and second intermediate coils L1, L2, Lm1 and Lm2.

Here, it shall be assumed that both turn ratio n11 between input and first intermediate coils L1 and Lm1 and turn ratio n22 between output and second intermediate coils L2 and Lm2 are given 0.65 as expressed in Equation 24 below:

$$\left. \begin{array}{l} n11 = \sqrt{\dfrac{Lm1}{L1}} = 0.65 \\ n22 = \sqrt{\dfrac{Lm2}{L2}} = 0.65 \end{array} \right\} \qquad \text{Equation 24}$$

In addition, it shall be assumed that both coupling coefficient k11 between input and first intermediate coils L1 and Lm1 and coupling coefficient k22 between output and second intermediate coils L2 and Lm2 are given 0.65, which is the same as turn ratios n11 and n22, as expressed in Equation 25 below:

$$\left. \begin{array}{l} k11 = n11 = 0.65 \\ k22 = n22 = 0.65 \end{array} \right\} \qquad \text{Equation 25}$$

According to the simulation results shown in FIG. 8A, all both-end voltages VL1, VL2, VLm1 and VLm2 at input, output, first intermediate and second intermediate coils L1, L2, Lm1 and Lm2 are the same. Likewise the case shown in FIG. 7A, when the switch is turned on, as expressed in Equation 14 above, it yields:

$VL1=VL2=VLm1=VLm2=(Vi-Vo)\div 2\approx 35\ V$

When the switch is turned off, as expressed in Equation 18, it yields:

$VL1=VL2=VLm1=VLm2=-Vo\div 2\approx 25\ V$

In addition, regarding ripple currents $\Delta IL1$, $\Delta IL2$, $\Delta ILm1$ and $\Delta ILm2$ at input, output, first intermediate and second intermediate coils L1, L2, Lm1 and Lm2 according to the simulation results shown in FIG. 8B, ripple current $\Delta IL1$ of the input coil L1 is electromagnetically coupled with first intermediate coil Lm1 having coupling coefficient k11 and ripple current ΔIL2 of input coil L2 is electromagnetically coupled with first intermediate coil Lm2 having coupling coefficient k22. Thus, irrespective of whether the switch is turned on or off, like the case shown in FIG. 4C, it yields:

ΔIL1=ΔIL2≈0 A (zero ripple)

Regarding the ripple currents of first and second intermediate coils Lm1 and Lm2, like the case shown in FIG. 7B, when the switch is turned on, it yields:

ΔILm1=ΔILm2=(Vi−Vo)×ton÷(2×Lm)≈2.9 A

When the switch is turned off, it yields:

ΔILm1=ΔILm2=Vo×toff÷2×Lm=Vo×(10−ton)÷(2×Lm)≈ 2.9 A

The ripple currents are the same value irrespective of whether the switch is turned on or off.

Effects of Embodiment

The step-down switching DC-DC converter of this embodiment can obtain the following effects by adopting a construction in which first intermediate capacitor C1 and first intermediate coil Lm1 are provided on the input side, second intermediate capacitor C2 and second intermediate coil Lm2 are provided on the output side, input coil L1 and first intermediate coil Lm1 are electromagnetically coupled, and output coil L2 and the second intermediate coil Lm2 are electromagnetically coupled.

First, since ripple currents at the input and output coils L1 and L2 can be eliminated (zero ripple), noise can be reduced.

Secondly, since noise is reduced and a filter to be added has a small size, the step-down switching DC-DC converter can be miniaturized.

Thirdly, since all both-end voltages VL1, VL2, VLm1 and VLm2 at the four coils including input, output, first intermediate and second intermediate coils L1, L2, Lm1 and Lm2 can be set to the same value, all the coils can be combined together and integrated into a single transformer and the step-down switching DC-DC converter can be further miniaturized.

Alternative Embodiments

Figure 9:
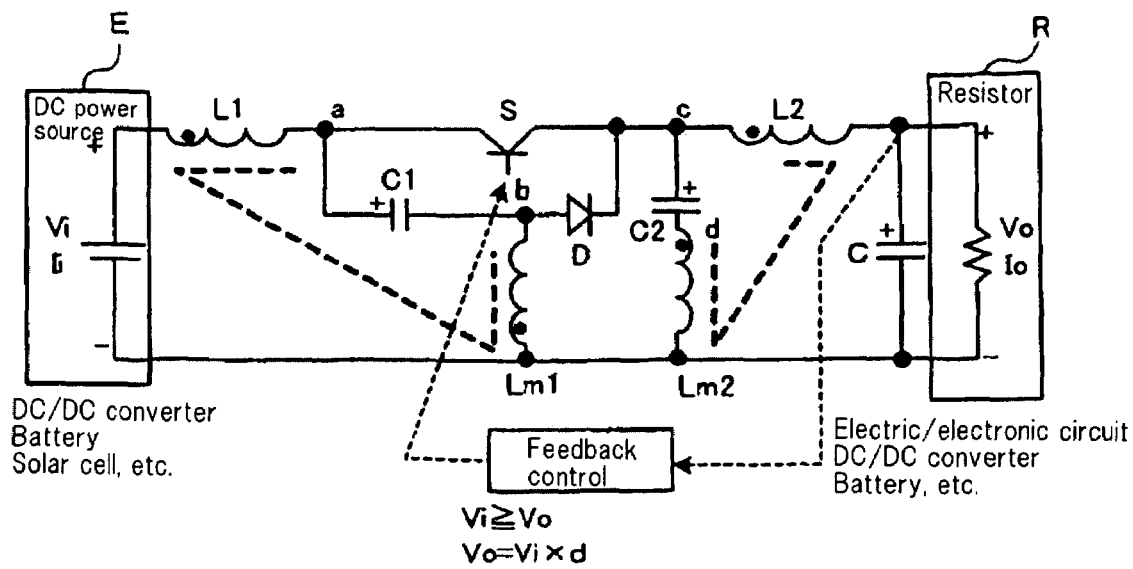
FIG. 9 is a circuit diagram illustrating another exemplary embodiment of the step-down switching DC-DC converter according to the present invention.

FIG. 9 is a circuit diagram illustrating another exemplary embodiment of the step-down switching DC-DC converter according to the present invention.

The circuit shown in FIG. 9 is constructed by employing a bipolar transistor as switch S in the step-down switching DC-DC converter shown in FIG. 3. The on-time of the bipolar transistor acting as the switch S is controlled by feeding back output voltage Vo so that it will become a predetermined voltage. Likewise , a bipolar transistor can also be substituted for switch S, diode D of the switching device.

Figure 10:
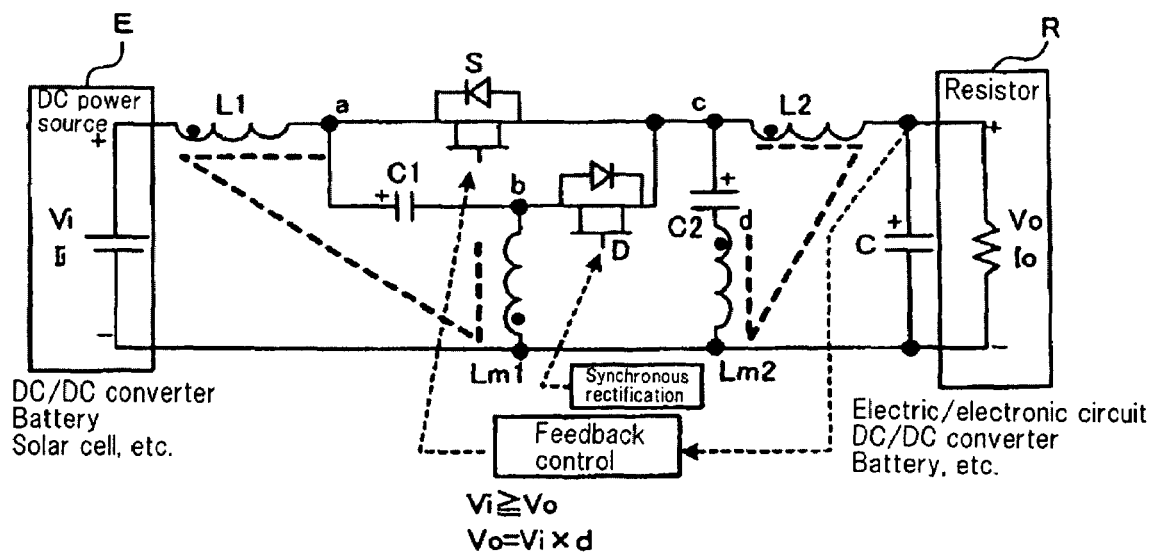
FIG. 10 is a circuit diagram illustrating a further exemplary embodiment of the step-down switching DC-DC converter according to the present invention.

FIG. 10 is a circuit diagram illustrating a further exemplary embodiment of the step-down switching DC-DC converter according to the present invention.

The circuit shown in FIG. 10 is constructed by employing power Metal-Oxide Semiconductor Field Effect Transistors (MOSFETs) as switch S and diode D in the step-down switching DC-DC converter shown in FIG. 3. Referring to FIG. 10, a diode connected in parallel to the power MOSFET is a power MOSFET parasitic diode. The on-time of the power MOSFET acting as switch S is controlled by feeding back an output voltage Vo so that it will become a predetermined voltage. In a period when the power MOSFET acting as the switch is turned off, the MOSFET acting as the switching device in place of diode D can be turned on to thereby reduce power loss of the power MOSFET of switch S (synchronous rectification).

While the present invention has been described with reference to the particular illustrative embodiments and the accompanying drawings, it is not to be limited thereto but will be defined by the appended claims. It is to be understood that those skilled in the art can substitute, change or modify the embodiments in various forms without departing from the scope and spirit of the present invention. For example, in addition to the above construction, the embodiments of the present invention can be implemented with the following constructions.

Both the input coil and the first intermediate coil can have the same turn ratio and electromagnetic coupling coefficient, and both the output coil and the second intermediate coil can have the same turn ratio and electromagnetic coupling coefficient.

Both the input coil and the second intermediate coil can have the turn ratio and of electromagnetic coupling coefficient, and both the output coil and the first intermediate coil can have the turn ratio and electromagnetic coupling coefficient;

The switch can be configured with a bipolar transistor or a power metal oxide semiconductor field-effect transistor.

In addition, the switching device can be configured using a diode, bipolar transistor or a power metal oxide semiconductor field-effect transistor.

While a preferred embodiment of the present invention has been described using specific terms, such description is for illustrative purposed only, and it is to be understood that changes and variations may be made without departing from the sprit or scope of the following claims.

What is claimed is:

1. A step-down switching DC-DC converter comprising:
a power source;
an input coil placed on an input side;
an output coil placed on an output side;
a switch turning on to establish a connection between the input coil and the output coil, and turning off to disconnect the connection between the input coil and the output coil;
an output capacitor smoothing an output voltage;
a first series circuit connected in parallel between a connection point, on which the input coil and the switch are connected to each other, and a negative pole of the power source, the first series circuit including a first intermediate capacitor and a first intermediate coil; and
a second series circuit connected in parallel between a connection point, on which the output coil and the switch are connected to each other, and the negative pole of the power source, the second series circuit including a second intermediate capacitor and a second intermediate coil,
wherein a connection point, on which the first intermediate capacitor and the first intermediate coil are connected to each other, is connected to a connection point, on which the second intermediate capacitor and the switch are connected to each other, via a switching device cooperating with the switch to complementarily turn on and off, and
wherein the input coil and the first intermediate coil are electromagnetically coupled with each other, and the output coil and the second intermediate coil are electromagnetically coupled with each other.

2. The step-down switching DC-DC converter according to claim 1, wherein both the input coil and the first intermediate coil have the same turn ratio and of electromagnetic coupling coefficient, and both the output coil and the second intermediate coil have the same turn ratio and electromagnetic coupling coefficient.

3. The step-down switching DC-DC converter according to claim 1, wherein the switch comprises a bipolar transistor or a power metal oxide semiconductor field-effect transistor.

4. The step-down switching DC-DC converter according to claim 1, wherein the switching device comprises a diode, bipolar transistor or a power metal oxide semiconductor field-effect transistor.

5. A step-down switching DC-DC converter comprising:
a power source;
an input coil placed on an input side;
an output coil placed on an output side;
a switch turning on to establish a connection between the input coil and the output coil, and turning off to disconnect the connection between the input coil and the output coil;
an output capacitor smoothing an output voltage;
a first series circuit connected in parallel between a connection point, on which the input coil and the switch are connected to each other, and a negative pole of the power source, the first series circuit including a first intermediate capacitor and a first intermediate coil; and
a second series circuit connected in parallel between a connection point, on which the output coil and the switch are connected to each other, and the negative pole of the power source, the second series circuit including a second intermediate capacitor and a second intermediate coil,
wherein a connection point, on which the first intermediate capacitor and the first intermediate coil are connected to each other, is connected to a connection point, on which the second intermediate capacitor and the switch are connected to each other, via a switching device cooperating with the switch that is to be complementarily turned on and off, and
wherein the input coil and the second intermediate coil are electromagnetically coupled with each other, and the output coil and the first intermediate coil are electromagnetically coupled with each other.

6. The step-down switching DC-DC converter according to claim 5, wherein both the input coil and the second intermediate coil have the same turn ratio and electromagnetic coupling coefficient, and both the output coil and the first intermediate coil have the same turn ratio and electromagnetic coupling coefficient.

7. The step-down switching DC-DC converter according to claim 5, wherein the switch comprises a bipolar transistor or a power metal oxide semiconductor field-effect transistor.

8. The step-down switching DC-DC converter according to claim 5, wherein the switching device comprises a diode, a bipolar transistor or a power metal oxide semiconductor field-effect transistor.

* * * * *